United States Patent [19]

Lemelson

[11] 4,193,959
[45] Mar. 18, 1980

[54] PRESSURE FORMING METHOD

[76] Inventor: Jerome H. Lemelson, 85 Rector St., Metuchen, N.J. 08840

[21] Appl. No.: 170,625

[22] Filed: Aug. 10, 1971

Related U.S. Application Data

[63] Continuation-in-part of Ser. No. 813,804, Mar. 27, 1969, abandoned, which is a continuation-in-part of Ser. No. 501,174, Oct. 22, 1965, abandoned, which is a continuation-in-part of Ser. No. 393,292, Aug. 31, 1964, abandoned, which is a continuation-in-part of Ser. No. 559,232, Jan. 16, 1956, Pat. No. 3,401,418.

[51] Int. Cl.² .............................................. B29D 7/02
[52] U.S. Cl. ................... 264/166; 264/216; 264/299
[58] Field of Search ................. 264/112, 299, 166

[56] References Cited
U.S. PATENT DOCUMENTS

| 2,550,774 | 5/1951 | Clem | 18/2 C |
| 3,230,127 | 1/1966 | Cleeremann et al. | 18/26 |
| 3,267,191 | 8/1966 | Williams et al. | 264/166 |

*Primary Examiner*—Robert F. White
*Assistant Examiner*—James R. Hall

[57] ABSTRACT

A method is provided for embossing material, such as plastic, in the form of a sheet under controlled conditions. In one form, embossing takes place while the plastic is confined and compressed between an endless sheet or belt and an extended area of the embossing surface of a drum. Pressure applied to the material being embossed or continuously cast against the drum may be such as to provide for the controlled solidification or setting of the material so as to reduce the shrinkage and warpage thereof and to control the dimensions of the sheet and its surface formations.

In one form, a fluent material such as a molten polymer is forced under pressure between an embossing roll and the surface of a sheet compressed against peripheral or border surfaces of the roll. A dynamic seal is provided between the injector, the embossing or casting roll and the guide sheet. The seal may be partially effected by solidifying border portions of the sheet-like formation of material fed to the apparatus.

6 Claims, 5 Drawing Figures

PRESSURE FORMING METHOD

RELATED APPLICATIONS

This is a continuation-in-part of application Ser. No. 813,804 filed Mar. 27, 1969 now abandoned which was a continuation-in-part of Ser. No. 501,174 filed Oct. 22, 1965, now abandoned, which in turn was a continuation-in-part of Ser. No. 393,292 filed Aug. 31, 1964 now abandoned which is a CIP of application Ser. No. 559,232 filed Jan. 16, 1956 now U.S. Pat. No. 3,401,418.

SUMMARY OF THE INVENTION

It is known in the art to emboss sheet materials such as those made of plastics, metals, alloys and laminates by feeding said sheet materials to the bite of a pair of rolls, one of which rolls has its surface shaped to provide indentations and/or protrusions in the surface of the sheet fed thereto. Such apparatus has a number of shortcomings which limits its application. For example, the force applied to the sheet being embossed is limited to that below which the sheet will flow or extrude laterally. Many materials such as synthetic plastic polymers are unable to resist lateral flow if compressed beyond a certain degree and attempts to effect deep embossments therein may result in the extrusion of the material of the sheet in a lateral direction so that the width of the sheet is not maintained constant. Frequently, such as in the production of sheet material, as described hereafter, having lenticular or reflecting formations provided in either or both of its major surfaces, it is necessary to provide and retain substantial pressure against the sheet material during the embossing thereof and until it has at least partially solidified or set so as to reduce shrinkage, warpage or deformation thereof to a degree whereby the optical characteristics of the sheet will not be adversely affected by uncontrolled shrinkage. Conventional embossing apparatus merely provides for passage of the sheet to be embossed between an embossing roll and a back-up or depressor roll aligned therewith.

Accordingly, it is a primary object of this invention to provide a new and improved sheet forming method which may be utilized to perform one or more of the functions of forming a sheet of material, shaping a formed sheet or the sheet formed thereby with surface irregularities such as embossments, laminating formed sheets of materials, providing improved surface layers or coating on formed sheet of material, sintering one or more materials on formed sheets of materials and other operations relative to formed or forming sheets of material.

Another object is to provide an improved sheet forming method which is also capable of simultaneously embossing the surface of a sheet in the same operation in which it is formed to shape.

Another object is to provide an improved method for forming a sheet of material between rolls in a manner similar to calendering in which substantially higher pressures may be derived to form the sheet than by conventional calendering techniques.

Another object is to provide a method for forming sheet material between a pair of rolls such as embossing rolls and for retaining said sheet material against one of said rolls while the material thereof sets or cures so as to controllably retain the shape of the sheet.

Another object is to provide an improved method for forming multi-layer sheet materials.

Another object is to provide an improved method for continuously forming a member such as a sheet, rod, tube or other shape by extruding or continuously casting same to shape, and continuously effecting one or more further secondary operations thereon such as drawing, embossing, rolling, surface finishing, coating or other operation necessary to complete fabricating operations on the material without interrupting its continuous flow as ordinarily necessitated to perform such secondary operations.

Another object is to provide a method for continuously forming monomers to shape and curing same as they are formed.

With the above and such other objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 1:
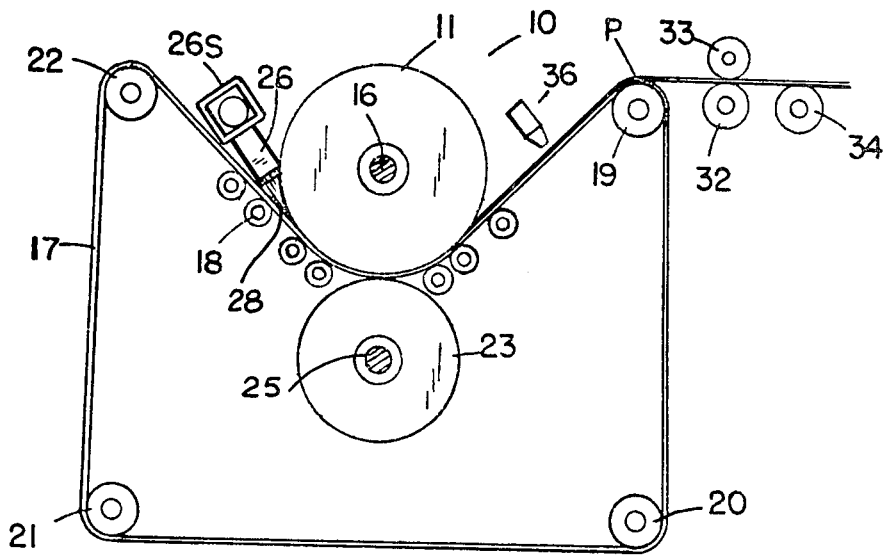
FIG. 1 is a side view illustrating apparatus for continuously forming and effecting secondary operations such as embossing, compressing or the like or sheet material.
Figure 2:
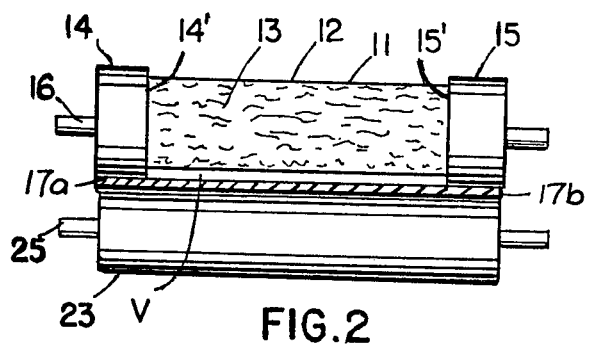
FIG. 2 is an end elevational view of a portion of the embossing roll assembly of FIG. 1.

There is shown in FIG. 1 an apparatus for forming sheet material from raw material such as a semi-molten compound or mass of plastic such as a thermoplastic or thermosetting polymer, or other suitable material such as ceramic or glass. The apparatus 10 includes a first roll 11 which is shaped as illustrated in FIG. 2 and is in operative alignment with a second roll 23, also shown in greater detail in FIG. 2. A preformed bucking sheet 17 of suitable material is fed between the two rolls and may comprise part of the sheet forming apparatus of FIG. 1 or a component of a laminate to be formed by means of said apparatus. In FIG. 1, the bucking sheet 17 defines a portion of the apparatus 10 and is guided and power driven in a predetermined path defined in part by portions of roll 11 and small auxiliary rolls 18 shown compressively engaging border portions of bucking sheet 17 against end portions 14 and 15 of the roll 11. Further rolls 19–22 guide the bucking sheet 17 in a closed loop path permitting it to be constantly fed into engagement with roll 11 although bucking sheet 17 may also be fed from a coil supply thereof and coiled or cut to length after passing between rolls 11 and 23. Rolls 11 and 23, as well as one or more of the other rolls illustrated in FIG. 1, are preferably power driven to facilitate operation of the apparatus as hereinafter described.

Roll 11, illustrated in greater detail in FIG. 2, is defined by a central portion 12 of substantially cylindrical configuration which central portion may be smooth or may contain indentations and/or protrusions 13 in the surface thereof for embossing sheet material set into engagement with said roll or formed thereby. Disposed at the sides of the central portion 12 are cylindrical portions 14 and 15 of greater diameter than 12 and each preferably of the same diameter. A shaft 16 extends through and protrudes from the end faces of the roll 11 for supporting same in respective roller or ball bearings, not shown, while roll 23 is rotatably supported on its shaft 25. Both rolls 11 and 23 may be power rotated by the same or separate motors.

Figure 3:
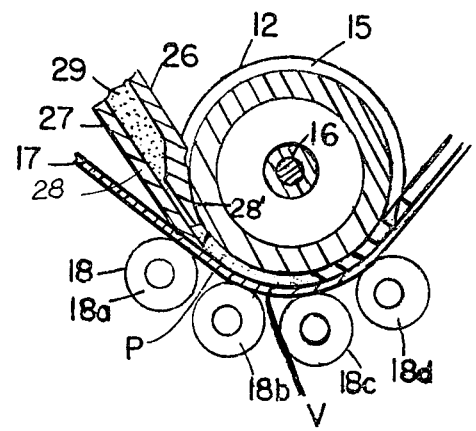
FIG. 3 is a side cross sectional view of part of the apparatus of FIG. 1.

Shown in abutment with the cylindrical surfaces of portions 14 and 15 of roll 11 is the bucking sheet 17 which may comprise stainless steel or other sheet metal if utilized as part of the sheet forming apparatus or any suitable material desired to be laminated to the material disposed therebetween and the surface of portion 12 of roll 11. In other words, bucking sheet 17 and roll 11 define a confined arcuate clearance volume V shown in FIG. 2 starting where the border portions 17a and 17b of bucking sheet 17 come into contact with roller portions 14 and 15 and continuing around the roll 11 until bucking sheet 17 leaves the roller portions as shown in FIG. 3. Such clearance volume is thus defined by roll 11 and the inner surfaces 14' and 15' of formations 14 and 15. Sheet material, particulate material, semi-molten plastic, ceramic or metal may be fed to the arcuate volume V and maintained so confined for that portion of its path of flow defined by bucking sheet 17 as long as it is engaged against the surfaces of portions 14 and 15 of the roll 11. In other words, whereas material fed between the two embossing or calendering rolls which are spaced close together, is compressed only in the region where the two rolls are closest to each other, in the apparatus of FIGS. 1 and 2, compression of the material fed to the volume V, whether it be a preformed sheet or flowable plastic material, is effected and maintained in said arcuate during the entire length of its travel between the bucking sheet 17 and roll 11 which arcuate volume may define a distance almost equal to the circumference or roll 11 depending on the number of small auxiliary rolls 18 retaining bucking sheet 17 against the end portions 14 and 15 of roll 11. Various means may be provided for feeding material between the facing surfaces of bucking sheet 17 and roll 11 to form, emboss, at least partially solidify or cure said material while it is so confined. In other words, depending on auxiliary apparatus provided with the apparatus of FIGS. 1 and 2, sheet material or plate may be pressure formed or cast thereby, controllably calendared, pressure embossed at substantially higher pressures than those derived in conventional pairs of embossing rolls, laminated, formed insitu against other sheets, sintered insitu under controlled pressure conditions, pressure bonded, welded or brazed under controlled conditions in which the welding or brazing material is not permitted to flow laterally, etc.

Figure 4:
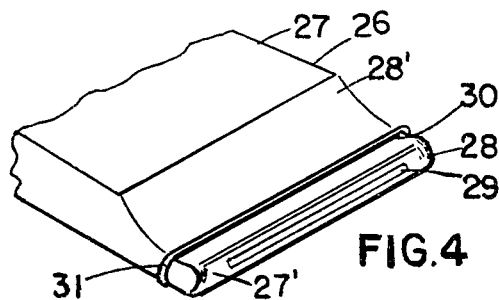
FIG. 4 is an isometric view of a material injector utilizable in the apparatus of FIG. 1

In FIG. 1 an injection head 26, shown in greater detail in FIG. 4, is adapted to provide an end-closure for the volume V so as to prevent back-flow of material ejected therefrom. The injection head 26 is preferably rigidly affixed to the frame supporting the rollers and includes a main body or base 27 having a tapered nose portion 28 at the end thereof with a passageway 29 extending therethrough for ejecting a sheet-like formation of material into the volume V. The nose 28 is adapted to just clear the surfaces of portion 12 of roll 11 and bucking sheet 17 at the inlet to the volume V. Pressure sealing across said inlet may be effected by maintaining sliding contact between the cylindrical surface 28' of the nose portion 28 of the injection head 26 and the surfaces of central portion 12 of the roller and the inside surface of bucking sheet 17 and/or by use of an elongated O-ring 31 or other form of dynamic seal riding in a channel 30 which circumscribes the nose of the head as illustrated in FIG. 4. The O-ring 31 is of such a configuration that it normally protrudes beyond the outer surface of the nose 28 of injection head 26 when seated in channel 30 and is compressed into said channel by the engaging surfaces and sidewalls 14' and 15' of the sides 14 and 15 of roll 11 and bucking sheet 17 so as to provide the desired dynamic fluid pressure seal thereacross. The channel 30 is preferably so shaped as to permit deformation of the O-ring as the result of fluid pressure caused by the material ejected from the passageway 29 in injection head 26 into the volume V wherein the solidified or partially solidified material remains in volume V. The O-ring 31 may be a hollow metal tube of suitable configuration or may comprise a synthetic material such as silicone rubber or other suitable polymer. Injection of fluid molding or coating material into volume V may be effected at a constant pressure of suitable quantity or intermittently at a fixed frequency so as to derive a compacting action.

The material injected into volume V through injection head 26 may be solidified per se, worked or cured or otherwise formed in said volume and is fed therefrom while disposed against the upper surface of bucking sheet 17. In the particular apparatus illustrated in FIG. 1, the sheet material is denoted by the notation P and is shown separating from the top of bucking sheet 17 beyond roller 19 and onto a take-off conveyor 34 which is illustrated as an endless belt conveyor although any suitable take-off or coiling means may be provided beyond roller 19. Roller 32 cooperates with roller 33 in driving bucking sheet P away from sheet 17.

Auxiliary equipment applicable to the apparatus of FIGS. 1-3 may include such appartus as means for heating and/or cooling the material or materials fed therethrough for the purposes of setting or solidifying same, curing or sintering said material. Said means may include means for ejecting a gas, liquid or vapor against either or both surfaces of bucking sheet 17, the inside of either or both rolls 11 and 23 or the surface of the material formed between roll 11 and bucking sheet 17. Such means may be disposed in any suitable location adjacent the inlet and/or take-off from the roll 11 or any suitable position adjacent bucking sheet 17. If it is required to heat bucking sheet 17 or the material being fed into arcuate volume V or removed from roll 11, suitable radiant or other form of heating means may be disposed along the surface to be heated either at the inlet or take-off location thereof.

In a still further embodiment, means may be provided upstream of the roll 11 for continuously forming a sheet of material and feeding same to the bite of the rolls 18 and 11 or bucking sheet 17 and roll 11 by extrusion, continuous casting or other means.

Figure 5:
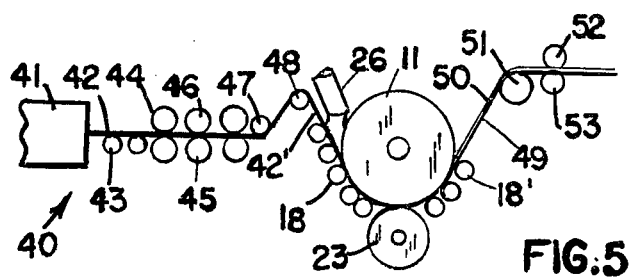
FIG. 5 is a side view of a modified form of the apparatus of FIG. 1.

FIG. 5 illustrates an apparatus for continuously forming a member such as a sheet of material, glass or polymer and continuously coating same with a material as described. The apparatus 40 includes a first means 41 for continuously forming material 42. The apparatus 41 may comprise, if member 42 is made of metal, an extrusion or continuous casting machine operative to continuously form the member 42 and pass same to a powered take-off conveyor 43. The apparatus 41 may also comprise a machine for extrusion forming member 42 of any suitable polymer, a paperboard manufacturing machine, a machine for weaving cloth, a machine for forming a non-woven fabric on a continuous basis or any suitable apparatus for forming material 42 continuously which material is to be extrusion coated by the means situated therebeyond.

In one form of the invention, if the apparatus 40 is a continuously operative metal extrusion machine or metal continuous casting machine, the member 40 may be conveyed to a plurality of rollers 45 and 46 which are power operative and define one or more stages of a rolling mill 44 operative to perform one or more operations on member 42 such as rolling and/or drawing same to a suitable shape or thickness prior to its being fed to the laminating or coating apparatus 10 situated downstream thereof. Notations 47 and 48 refer to directional rollers between which may be situated means for taking up and controlling any slack which may develop in the continuously extruded or otherwise formed sheet 42 prior to entering the laminating-embossing apparatus 10.

Operation of the apparatus 10 is as described wherein rolls 18 are power driven and situated to compress the sheet portion 42' downstream of mill 44, against extrusion head 26 and the cylindrical surfaces of end formations 14 and 15 of roller 11. Notation 18' refers to power operative rollers engaging the side portions of the laminated assembly 49 of sheet 42' and the coating material 50 against the cylindrical surfaces of the side portions 14 and 15 of roll 11 until the material 50 has solidified and been worked thereon to a desired condition. Notation 51 refers to a roller disposed beyond rolls 18' over which the laminated assembly 49 is driven to a take-off conveyor such as power operative rolls 52 and 53.

In another form of the invention described, it is noted that the rolls 18 and 23 employed to engage the bucking sheet 17 against an extended portion of the roll 11 may be increased or decreased in number depending on the characteristics of the material being embossed or coated and the pressure at which it is admitted to the cylindrical volume V. For certain applications, said rolls may also be eliminated if the bucking sheet 17 is tightly drawn against the roll 11 as it is driven by suitable tensioning means operative to effect sealing of the surface of the bucking sheet with the border portions of roll 11.

The apparatus illustrated in FIGS. 1-5 may be utilized for fabricating various sheet materials which are difficult, if not impossible, to fabricate by conventional embossing machinery. For example, it is herein proposed that the apparatus of FIGS. 1-5 be utilized to fabricate sheet material containing embossed surfaces requiring precise dimensions for optical reflection purposes. Such articles as retro-reflectors containing pyramidal indentations in one surface thereof operative to reflex reflect light to the vicinity of a source directing said light thereagainst, have heretofore only been produced by injection molding same. Conventional embossing apparatus may be utilized to produce suitable retro-reflective material in sheet form due to distortion and uncontrollable shrinkage experienced thereby whereas the apparatus of FIGS. 1-5, which permits controlled high-pressure embossing of plastics such as acrylics, rigid and flexible vinyls, cellulose acetate butyrates or glass may be utilized to produce same. Accordingly, the formations 13 in the surface of cylindrical embossing portion 12 of roller 11 may comprise a plurality of precisely made pyramidal indentations and/or protrusions operative to provide so-called corner reflecting surfaces in the transparent sheet material embossed thereby.

I claim:

1. A method of forming sheet material comprising: providing an elongated bucking sheet having a central portion and longitudinal border portions and feeding said bucking sheet against a cylindrical roll having a central portion of reduced diameter disposed a distance away from the central portion of said bucking sheet and having cylindrical end portions of greater diameter than said roll central portion with said cylindrical end portions compressively engaging the respective longitudinal border portions of said bucking sheet and sealingly engaged to said bucking sheet, rotating said cylindrical roll while feeding and maintaining said bucking sheet against the cylindrical end portions of the roll as the roll rotates and maintaining the border portions of said bucking sheet sealed to and in surface engagement with said end portions of said cylindrical roll so as to define an arcuate clearance volume between the central portion of the surface of said bucking sheet and the surface of the central portion of said cylindrical roll, feeding a thermoplastic material into the arcuate clearance volume defined by said bucking sheet and the central portion of said cylindrical roll and providing said thermoplastic material in said clearance volume under pressure and in a thermally deformable condition, and maintaining sealing engagement between said bucking sheet against the end portion of said cylindrical roll to prevent the outflow of said thermoplastic material therefrom while under said pressure, causing said thermoplastic material to be molded against and to conform to the shape defined by the central portion of said cylindrical roll and said bucking sheet while in said thermally deformable condition, and conveying said thermoplastic material partly around said cylindrical roll in the arcuate path defined by said arcuate clearance volume while reducing the temperature of said thermoplastic material as it is conveyed around said roll to cause it to set to substantially the shape defined by the central portion of said roll and said bucking sheet, and removing said bucking sheet and the material solidified thereagainst from said clearance volume.

2. A method in accordance with claim 1 wherein said thermoplastic material is flowed into said arcuate clearance volume in a molten condition and is molded to shape and solidified therein prior to its removal from said roll.

3. A method in accordance with claim 1 wherein said thermoplastic material is initially formed as a sheet and is fed between said bucking sheet and said cylindrical roll.

4. A method of forming sheet material comprising: providing a bucking sheet having a central portion and respective longitudinal border portions and feeding said bucking sheet against a cylindrical roll having a central portion of reduced diameter and cylindrical end portions of greater diameter than central portion with said end portions sealingly engaging said border portions of said bucking sheet, rotating said cylindrical roll and feeding said bucking sheet against and partly around said cylindrical roll as said roll rotates while maintaining both longitudinal border portions of said bucking sheet in sealing engagement with said end portions of said cylindrical roll so as to define an arcuate clearance volume between the central portion of the surface of said bucking sheet and the surface of said central portion of said cylindrical roll, feeding a thermosetting material in a moldable condition to the arcuate clearance volume defined by said bucking sheet and the central portion of said roll and applying heat to said thermosetting material while in said arcuate clearance volume, causing the thermosetting material to be molded against and conform to the shape defined by the surface defining said arcuate clearance volume, and conveying said thermosetting material partly around said roll in said arcuate path while thermally setting same to permit said material to retain its shape, and removing said bucking sheet and said molded thermosetting material from said cylindrical roll.

5. A method of forming plastic material comprising feeding a thermoplastic resin under pressure to a molding cavity defined in part by the cylindrical surface of a drum in which cylindrical surface is provided a plurality of sub-cavities formed therein around the periphery of said drum and said molding cavity is further defined by a closure means supported adjacent said drum and having a cylindrical surface disposed adjacent to the cylindrical surface of said drum and defining annular space between drum and said closure means, causing said thermoplastic resin to flow and fill said cavities in said drum and conform to said annular space between said cylindrical surface of said drum and said conforming surface of said closure means, rotating said drum to present different cavities in said cylindrical surface of said drum to said molding material, solidifying said plastic resin to the shape defined by said annular space between said closure means and said drum and the cavities formed in said drum so as to form an elongated molding which extends continuously around a portion of the surface of said drum, and after said elongated member of plastic resin has set to the shape defined by said annular space and said cavities in the surface of said drum, continuously removing the molding from the vicinity of said drum as it emerges from said annular space between said drum and said closure means.

6. A method in accordance with claim 5 which includes continuously flowing said thermoplastic resin into the annular space between said drum and said closure means while continuously rotating said drum about its axis in a given direction.

* * * * *